Feb. 18, 1958  H. MÜLLER  2,823,849
FLUID DRIVE FOR TURBO UNITS
Filed May 17, 1954
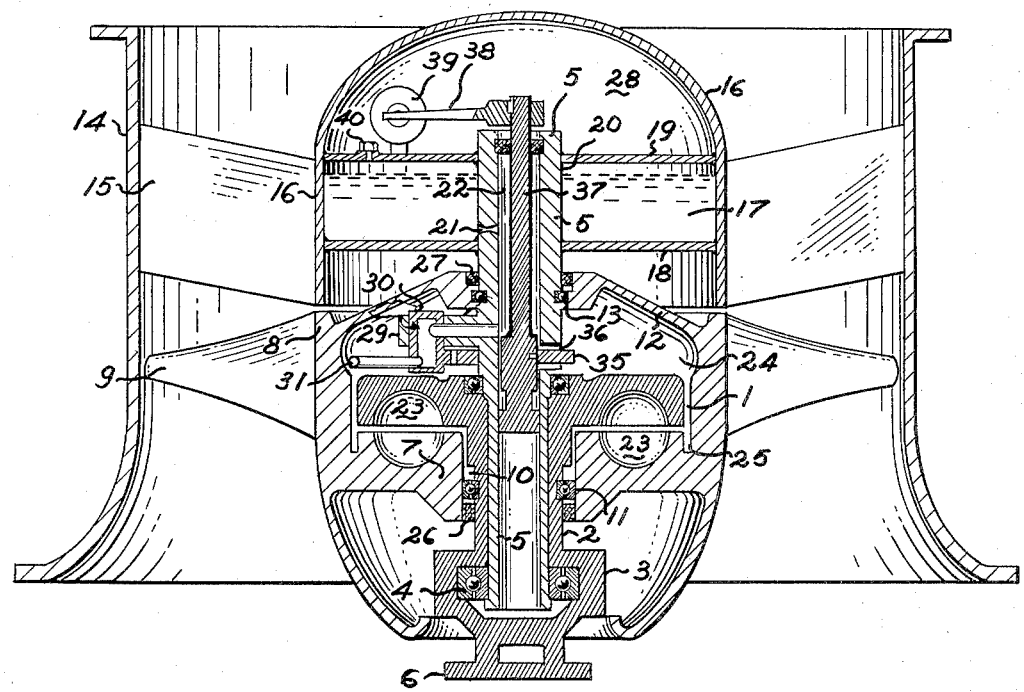
INVENTOR
HELMUT MÜLLER
BY Toulmin & Toulmin
ATTORNEYS

United States Patent Office 2,823,849
Patented Feb. 18, 1958

2,823,849

FLUID DRIVE FOR TURBO UNITS

Helmut Müller, Heidenheim (Brenz), Germany, assignor to J. M. Voith, G. m. b. H., Heidenheim (Brenz), Germany, a German corporation Application May 17, 1954, Serial No. 430,370

Claims priority, application Germany May 15, 1953

9 Claims. (Cl. 230—11)

This invention relates to a turbo drive for use in turbo units such as fans or blowers or the like comprising a fluid coupling and means for controlling the number of revolutions of the driven shaft.

It relates in particular to such turbo drives wherein the impeller and the runner of the fluid coupling are arranged inside the hub of the wheel bearing the vanes of the turbo unit, and wherein the vanes of the blower wheel are rigidly attached to the turbine wheel of the fluid coupling.

The invention furthermore relates to a turbo drive of the above mentioned type wherein the number of revolutions of the driven shaft is controlled by regulating the amount of fluid filling, i. e., the quantity of fluid in the working chamber of the coupling and therewith the transmission ratio of force is being altered.

It is a further object of this invention to provide a turbo drive so arranged in a turbo unit that the space occupied by the latter is markedly less than that of hitherto known units of the same power output and efficiency.

It is another object of this invention to provide a turbo drive in a turbo unit such as for instance a blower, wherein all connecting piping and other conduits hitherto arranged on the outside of the machine are made superfluous.

It is yet another object of the invention to provide a turbo drive in a turbo unit wherein no separate space is required outside the rotating parts for a reservoir for the coupling fluid.

It is finally an object of the invention to provide a turbo drive in turbo units such as fans or blowers and the like wherein said drive requires less space and fewer parts than the hitherto known types of apparatus of this kind and no conduits or pipings are arranged on the outside of the turbo drive.

It has already been proposed to include a fluid source of substantially constant pressure connected with a scoop tube within the fluid coupling from which source fluid will flow when the coupling is being filled up, and to which fluid will flow when the coupling is being emptied. The fluid source in arrangements of this kind is to comprise an overhead tank and a pump, the discharge side of which is connected both to the scoop tube and to the reservoir. An air connection is also provided between the fluid coupling and the reservoir to provide for an exchange of air between the latter and the coupling when the fluid level in the coupling varies, the flow of fluid through the scoop tube taking place only during a change in the fluid level in the coupling.

The invention consists in a turbo drive of the aforesaid kind which is so devised that a stationary reservoir for the coupling fluid is arranged inside the hub housing, for instance of a blower unit, and is supported, for instance, by the guide blades of the latter. This results in a particularly compact and uncomplicated arrangement which is especially adapted for driving turbo units having a vertical shaft.

It is advantageous to devise the stationary reservoir as an axially symmetrical overhead tank, i. e. the reservoir is to be arranged above the coupling and the coupling fluid will flow automatically from the reservoir to the working chamber of the fluid coupling due to the force of gravity. It is further an advantage of this invention that the reservoir can be so devised and arranged that it may serve to support one or several of the rotary elements of the turbo unit including the fluid coupling. This is achieved by providing the reservoir with a centrally arranged shaft means for supporting thereon the hub or hubs of the rotary parts of the fluid coupling as well as the driven part of the turbo machine.

This supporting shaft is to be hollow so as to serve as a connection between the working chamber of the fluid coupling and the interior of the reservoir. Furthermore the adjusting mechanism of the device for controlling the filling may be extended through this hollow shaft means, for instance upwardly out of the latter, where it may be connected with automatic control means such as a thermostat or the like located on top of the reservoir. The device for controlling the filling of the fluid coupling may consist preferably of a displaceable or rotatable scoop tube which is located inside a scoop tube chamber.

A further particularly advantageous feature of this invention is obtained by providing a turbo drive with an overhead reservoir and a working chamber of the fluid coupling being connected with each other by one single conduit whose one end is formed by a calibrated opening while the other end opens into the scoop tube. The scoop tube chamber is axially arranged next to the working chamber and is connected with the latter in such a manner that free unthrottled communication is achieved between both chambers. The advantages of this special arrangement of having one single connecting conduit provided between the overhead reservoir and the scoop tube are due to the fact that no pumping energy is consumed for filling the fluid coupling or maintaining the latter filled, as long as the turbo blower is operating at that constant speed which corresponds to the respective filling in the fluid coupling, i. e. while the filling in the coupling is not altered by the action of the control means. For the fluid pressure created in the scoop tube is balanced, during these periods of unchanged control, by the fluid pressure which corresponds to the level of fluid in the overhead reservoir, and no flow of coupling fluid takes place in the connecting conduit between the scoop tube and the reservoir. The smaller the flow of fluid through the coupling, the more does it become permissible to decrease the number of revolutions of the fluid coupling.

The most favorable conditions with regard to the consumption of energy prevail if there is no flow of fluid at all through the coupling when and as long as the control means maintain a constant speed of operation, i. e. if no fluid at all is then flowing through the connecting conduit between the reservoir and the coupling.

Another advantage which results from the provision of a connecting conduit between the reservoir and the scoop tube in accordance with the invention, resides in the fact that comparatively very small forces are necessary for adjusting the scoop tube as long as the flow of fluid through the aforesaid conduit is very low or has ceased completely. This is also advantageous when using a thermostat for adjusting the scope tube, since such thermostats cannot exercise great adjusting force without the use of special means such as amplification by means of servo motors or the like. Such means become unnecessary in an arrangement according to the invention on account of only small forces being required for adjusting the scoop tube under the aforesaid conditions.

The objects referred to above and still other objects and advantages of this invention will be more apparent upon reference to the following description taken in connection with the accompanying drawings, in which there is illustrated more or less diagrammatically a turbo drive according to the present invention serving as the hub for a fan or blower, which are used, for instance, for drawing air through a cooler of a large engine such as a diesel engine.

In the drawings:

Figure 1 is a longitudinal sectional view of an embodiment of the present invention showing the turbo blower having the fluid coupling arranged within the hub of the blower wheel.

Figure 2 is a partial sectional view of the scoop tube and scoop tube rotating device shown in Figure 1.

Referring to the drawings somewhat more in detail, the machine, according to the present invention, comprises the impeller 1 of the fluid coupling which is rigidly attached to the hollow driving shaft 2. This shaft has at its lower end an enlarged portion 3 forming an inner recess wherein a bearing 4 of any suitable kind is provided supporting the driving shaft and resting on the hollow carrying shaft 5.

The end portion of the hollow driving shaft 2 bears a flange 6 whereby the driving shaft is connected to a motor, not shown in the drawing. The runner or turbine wheel 7 cooperating with the impeller 1 is rigidly connected with the hollow blower wheel body 8 which forms the blower wheel, together with rotating vanes 9.

The hub body 8 of the blower wheel is formed as a hollow cylinder having its lower part rounded to form a rotary ellipsoid and provided with a central opening 10 at its lower end through which the hollow driving shaft 2 passes downwardly. The blower wheel body is supported on the one hand by a bearing 11 of a suitable kind provided between the runner 7 and the hollow driving shaft 2, and on the other hand by a circular flange 12 inwardly projecting from said blower wheel body 8 toward the carrying shaft 5. It is supported against this carrying shaft 5 by a suitable bearing 13.

The blower wheel body 8 carrying the vanes 9 and the hub housing 16 are disposed within an outer cylindrical casing 14 of the blower, and supported therein by the stationary guide blades 15 which support the hub housing 16. The rotating vanes 9 cooperate with these stationary guide blades 15. Within this housing 16 the annular reservoir 17 is arranged as a cylinder having a circular bottom plate 18 and a top plate 19, both rigidly and tightly attached at their outer periphery to the inner wall of said hub or housing 16 and both having a central opening wherein the hollow carrying shaft 5 is arranged. The edges of the central opening of the top plate 19 and the bottom plate 18 are rigidly and tightly attached to the carrying shaft 5 which thereby is made stationary and forms an inner annular wall 20 for the reservoir 17. The reservoir 17 is connected through an opening 21 in the hollow carrying shaft with the hollow space inside the blower wheel body 8. This hollow space consists of the working chamber 23 between the impeller 1 and the runner 7, and the scoop tube chamber 24 between the back side of the impeller 1 and the circular flange 12 of the blower wheel body.

The scoop tube chamber 24 is connected with the working chamber 23 by a ring-shaped space 25 establishing free communication without any throttling effect between the working chamber 23 and the scoop tube chamber 24. Oil seals 26 between the runner 7 and the hollow driving shaft 2 on the one hand, and oil seals 27 between the circular flange 12 and the carrying shaft 5 on the other hand provide fluid-tight sealing for the hollow space inside the blower wheel 8. The stationary hollow carrying shaft 5 extends from the lower end of the driving shaft through the latter up to the dome-like top chamber 28. This shaft 5 is provided with a lateral arm 29 extending into the scoop tube chamber 24 and carrying a hollow pin 30 which bears at its lower end the scoop tube 31. The inner space of this hollow pin 30 is connected through an opening 32 with the internal bore 33 of the lateral arm 29. A continuous connection is thus provided between the reservoir by way of the opening 21, the internal bore 22 of the carrying shaft 5, the bore 33 in the lateral arm 29, the internal hollow space of the pin 30 and the scoop tube 31 to the scoop tube chamber, and from there by way of the ring-shaped space 25 to the working chamber 23.

The hollow pin 30 bears on its lower end opposite the scoop tube a toothed segment 34 which engages another toothed segment 35 protruding from the carrying shaft 5 through a lateral slot 36, and rigidly attached to a shifting rod 37 provided inside the hollow shaft and extending upwardly out of that shaft into the top chamber 28 of the hub housing 16.

A shift lever 38 is provided at the upper end of the shifting rod 37 and is operated by a thermostat 39 or the like. The top chamber 28 is connected with the reservoir 17 by way of a bore in the filling screw 40 provided in the top plate 19 of the reservoir 17.

In operation, the conduit 22 stands under a substantially constant pressure. The scooping pipe or scoop tube 31 dips into the fluid in the coupling to such an extent as exactly to balance the pressure delivered thereto from conduit 22.

Any deflection of the scooping tube from this position of balance will then bring about either filling or emptying of the coupling, according to the direction of deflection of the scoop tube, until the original state of equilibrium has again been established and at which time there will be no or very little fluid circulation between the overhead tank and the coupling.

If the scoop tube is in its outermost position as is shown in Figure 1 of the accompanying drawings, it will scoop up all the fluid from the scoop tube chamber 24 and from the working chamber 23 of the coupling, being in free unthrottled communication with the former, and will urge the fluid upwardly by way of the conduit 22 into the overhead reservoir 17. The turbo blower will then run at its slowest speed, i. e. if the blower is used for instance for cooling purposes, its cooling effect will be particularly small. If temperature in the space to be cooled then begins to rise owing to the small cooling effect of the blower, the thermostat will react and swing the scoop tube somewhat more inwardly. Thereby fluid will begin to flow through the conduit 22 into the scoop tube chamber 24 and correspondingly into the work chamber 23 of the coupling in such amount that the scooping mouth of the scoop tube will again just reach the fluid level of the rotating ring-shaped volume of fluid in the scoop tube chamber.

The greater the filling of the coupling, the greater will be the transmission ratio of movement from the impeller to the turbine wheel and the higher will be the speed of the turbo blower. On the other hand, in case of an opposite control action of the thermostat, the scoop tube will again swing outwardly and will scoop up part of the fluid and thereby decrease the degree of filling of the coupling.

It will be understood that this invention is susceptible to modification in order to adapt it to different usages and conditions, and, accordingly, it is desired to comprehend such modifications within this invention as may fall within the scope of the appended claims.

What is claimed is:

1. In a turbo unit such as a fan or blower and the like, having a running wheel mounted on a vertical hub, a housing for said hub, stationary guide blades supporting said tub housing, and a drive mounted inside said hub, said drive comprising a fluid coupling having a working chamber between the impeller and the turbine wheel thereof, an overhead reservoir for receiving coupling fluid therein, said reservoir being arranged above said hub within said hub housing; hollow shaft means centrally fixed in said overhead reservoir, said hollow shaft means supporting the rotary parts of said turbo unit and of said fluid coupling; and a connecting conduit from said overhead reservoir to said working chamber, said conduit leading through said hollow shaft means.

2. In a turbo unit such as a fan or blower and the like having a running wheel mounted on a vertical hub, a housing for said hub, stationary guide blades supporting said hub housing, and a drive mounted inside said hub, said drive comprising a fluid coupling having a working chamber between the impeller and the turbine wheel of said fluid coupling, and an adjustable scoop tube; an overhead reservoir for receiving coupling fluid therein, said reservoir being arranged above said hub within said hub housing; control means for altering the filling of said fluid coupling through controlling the exchange of fluid between said working chamber and said reservoir by adjusting said scoop tube; hollow shaft means centrally fixed in, and extending vertically from said overhead reservoir, said hollow shaft means supporting the rotary parts of said turbo unit and of said fluid coupling, said control means extending through said hollow shaft means, and a conduit connecting said overhead reservoir to said working chamber, said conduit leading through said hollow shaft means.

3. In a turbo unit such as a fan or blower or the like having a running wheel mounted on a vertical hub, a housing for said hub, stationary guide blades supporting said hub housing, and a drive mounted inside said hub, said drive comprising a fluid coupling having a working chamber between the impeller and the turbine wheel thereof, a scoop tube chamber coaxially arranged adjacent said working chamber, an annular opening between said working chamber and said scoop tube chamber forming a free communication between both chambers, and an adjustable scoop tube arranged inside said scoop tube chamber, an overhead reservoir for receiving coupling fluid therein, said reservoir being arranged above said hub within said hub housing; control means for altering the filling of said fluid coupling through controlling the exchange of fluid between said working chamber and reservoir by adjusting said scoop tube, hollow shaft means centrally fixed in, and extending vertically from said overhead reservoir; said hollow shaft means supporting the rotary parts of said turbo unit and of said fluid coupling, said scoop tube being rotatably mounted on said hollow shaft means, said control means extending through said hollow shaft means, and a conduit connecting said overhead reservoir to said scoop tube chamber, said conduit being formed by said hollow shaft means.

4. In a turbo unit such as a fan or blower and the like having a running wheel provided with blades and mounted on a vertical hub, and stationary guide blades for cooperation with said blades, said guide blades supporting a housing for said hub, a drive mounted inside said hub of said running wheel, said drive comprising a fluid coupling having a working chamber between the impeller and the turbine wheel of said coupling, and an overhead reservoir for receiving coupling fluid therein, said reservoir being arranged above said hub within said hub housing; hollow shaft means centrally fixed in said overhead reservoir, said hollow shaft means supporting the rotary parts of said turbo unit and of said fluid coupling; and a conduit from said overhead reservoir to said working chamber, said conduit leading through said hollow shaft means.

5. In a turbo unit having a running wheel provided with blades and mounted on a vertical hub, and stationary and guide blades for cooperation with said blades, said guide blades supporting a housing for said hub, a drive mounted inside said hub of said running wheel, said drive comprising a fluid coupling having a working chamber between the impeller and the turbine wheel of said coupling, and an adjustable scoop tube, and overhead reservoir for receiving coupling fluid therein, said reservoir being arranged above said hub within said hub housing; control means for altering the filling of said fluid coupling through controlling the exchange of fluid between said working chamber and said reservoir by adjusting said scoop tube, hollow shaft means centrally fixed in, and extending vertically from said overhead reservoir; said hollow shaft means supporting the rotary parts of said turbo unit and of said fluid coupling; said scoop tube being rotatably mounted on said hollow shaft; and a conduit connecting said overhead reservoir to said scoop tube and working chamber, said conduit extending through said hollow shaft means.

6. In a turbo unit such as a fan or blower and the like having a running wheel provided with blades and mounted on a vertical hub, and stationary guide blades for cooperation with said blades, said guide blades supporting a housing for said hub, a drive mounted inside said hub of said running wheel, said drive comprising a fluid coupling having a working chamber between the impeller and the turbine wheel thereof, a scoop tube chamber coaxially arranged adjacent said working chamber, an opening between said working chamber and said scoop tube chamber forming a free hydraulic communication between both chambers, and an adjustable scoop tube, said scoop tube being arranged within said scoop tube chamber; an overhead reservoir for receiving coupling fluid therein, said reservoir being arranged above said hub within said hub housing; control means for altering the filling of said fluid coupling through controlling the exchange of fluid between said working chamber and said reservoir by adjusting said scoop tube; hollow shaft means centrally fixed in, and extending vertically from said overhead reservoir; said control means extending through said hollow shaft means; said scoop tube being pivotally mounted on said hollow shaft means; said hollow shaft means supporting the rotary parts of said turbo unit and of said fluid coupling; and a conduit connecting said overhead reservoir to said scoop tube chamber, said conduit being formed by said hollow shaft means.

7. In a turbo unit such as a fan or blower and the like having a casing, a running wheel provided with blades and mounted on a vertical hub inside said casing and stationary guide blades rigidly attached inside said casing for cooperation with said blades, said guide blades supporting a housing for said hub, a drive mounted inside said hub of said running wheel, said drive comprising a fluid coupling having a working chamber between the impeller and the turbine wheel of said coupling, and an overhead reservoir for receiving coupling fluid therein, said reservoir being arranged above said hub within said hub housing; hollow shaft means centrally fixed in said overhead reservoir, said hollow shaft means supporting the rotary parts of said turbo unit and of said fluid coupling; and a conduit from said overhead reservoir to said working chamber, said conduit leading through said hollow shaft means.

8. In a turbo unit comprising a running wheel provided with blades and mounted on a vertical hub and stationary guide blades mounted for cooperation with said blades, said guide blades supporting a housing for said hub, wherein said fluid coupling has a working chamber between the impeller and the turbine wheel of said coupling, and an adjustable scoop tube; said drive further comprising control means for altering the filling of said fluid coupling through controlling the exchange of fluid between said working chamber and said reservoir by adjusting said scoop tube, said shaft means being hollow and extending vertically from said overhead reservoir; said scoop tube being rotatably mounted on said hollow shaft; and a conduit connecting said overhead reservoir to said scoop tube and working chamber, said conduit extending through said hollow shaft means.

9. In a turbo unit comprising a running wheel provided with blades and mounted on a vertical hub and stationary guide blades mounted for cooperation with said blades, said guide blades supporting a housing for said hub, wherein said fluid coupling has a working chamber between the impeller and the turbine wheel thereof, a scoop tube chamber coaxially arranged adjacent said working chamber, an opening between said working chamber and said scoop tube chamber forming a free hydraulic communication between both chambers, and an adjustable scoop tube, said scoop tube being arranged within said scoop tube chamber; said drive further comprising control means for altering the filling of said fluid coupling through controlling the exchange of fluid between said working chamber and said reservoir by adjusting said scoop tube; said shaft means being hollow, centrally fixed in, and extending vertically from said overhead reservoir; said control means extending through said hollow shaft means; said scoop tube being pivotally mounted on means; said hollow shaft; and a conduit connecting said overhead reservoir to said scoop tube chamber, said conduit being formed by said hollow shaft means.

References Cited in the file of this patent

UNITED STATES PATENTS

| | | |
|---|---|---|
| 2,178,864 | Rosenberger | Nov. 7, 1939 |
| 2,283,644 | Nallinger | May 19, 1942 |
| 2,289,440 | Kugel | July 14, 1942 |
| 2,397,169 | Troller et al. | Mar. 26, 1946 |
| 2,425,885 | Jennings | Aug. 19, 1947 |
| 2,582,952 | Becker | Jan. 22, 1952 |